United States Patent

[11] 3,568,185

| [72] | Inventor | Jerome M. Page<br>Fullerton, Calif. |
|---|---|---|
| [21] | Appl. No. | 356,357 |
| [22] | Filed | Mar. 30, 1964 |
| [45] | Patented | Mar. 2, 1971 |
| [73] | Assignee | North American Rockwell Corporation |

[54] MAPPING SIGNAL DISPLAY APPARATUS
10 Claims, 4 Drawing Figs.

[52] U.S. Cl. .................................... 343/6, 343/16
[51] Int. Cl. .................................... G01s 9/00
[50] Field of Search ........................... 343/6, 6 (IR), 6 (TV), 16.1

[56] References Cited
UNITED STATES PATENTS

| 2,842,760 | 7/1958 | McLucas | 343/6 |
| 2,895,127 | 7/1959 | Padgett | 343/6 |
| 3,010,102 | 11/1961 | Ketchledge et al. | 343/6 |
| 3,025,515 | 3/1962 | Fairbanks | 343/6 |
| 3,053,932 | 9/1962 | Worst | 343/6 |
| 3,108,270 | 10/1963 | Fairbanks | 343/6 |

Primary Examiner—Richard A. Farley
Assistant Examiner—Malcolm F. Hubler
Attorneys—William R. Lane, L. Lee Humphries and Rolf M. Pitts ABSTRACT: Multiple-sensor means for detecting a multiple-energy target comprising pulsed energy monopulse scanning means for providing signals indicative of the range and direction of a detected target; passive radiant energy means in cooperation with said monopulse means for providing signals indicative of radiant energy radiated from said direction other than said pulsed energy; and signal combining means responsive to said pulsed energy means and said passive sensor means for providing a display signal indicating the presence of a target which both reflects said pulsed energy and radiates said radiated energy.

PATENTED MAR 2 1971

INVENTOR.
JEROME M. PAGE

BY *Rolf M. Pitts*

ATTORNEY

MAPPING SIGNAL DISPLAY APPARATUS

The subject invention relates to improved mapping means for displaying a target signal, and more particularly to means cooperating with a radar for providing a mapping display signal having improved target extent resolution.

In the utilization of radar information, such as in radar mapping applications, a radar system having an azimuth-scanning antenna is employed to generate signals indicative of the direction and range or distance of sensed terrain features or prominences. The display signals may be applied to a display device such as a cathode ray oscilloscope employed as a PPI (plan position indicator) device, in order to implement the desired mapping function. Conventional radar systems for providing signals indicative of the range of a detected target, employ directional antennas utilizing electrical scanning or physical drive mechanisms to provide target angle information. Where the target angular size (as viewed from the receiving antenna) is very large relative to both the antenna beamwidth and the angular resolution of the antenna scanning means, then the scanning antenna may also be used to provide information concerning the target angular size or transverse extent, such as the azimuth extent, for example, in a PPI display. In the prior art, the use of a nodding antenna (e.g., scanning in elevation) in cooperation with an azimuth scanning means has been used to provide both elevation and azimuth extent information (as well as both elevation and azimuth position information) regarding targets whose sizes are large relative to the beamwidth of the receiving antenna.

Where the angular shape and size or extent of the detected target (as viewed from the receiving antenna) is small relative to the antenna beamwidth, such beamwidth limits the accuracy of, and even prevents, the determination of target shape and extent by the above-described scanning means. However, the location or target angle of a small target lying within the beamwidth of the antenna may be determined relative to the antenna boresight or radiation axis of symmetry by well-known monopulse signal techniques.

Monopulse signal systems such as monopulse radars conventionally employ three types of information: (1) A sum signal representing the sum of four signals from each of four antenna apertures or horns, (2) an azimuth difference signal, and (3) an elevation difference signal. These three types of signals are employed by a monopulse computer in the computation of tracking angles and range information to define the position of a target relative to the monopulse radar.

The use of a four-horn antenna feed arrangement, the excitation of each horn of which is mutually equal and in-phase, provides tracking angle information in two mutually orthogonal planes (both intersecting the boresight axis of the radar antenna), and is referred to as a dual-plane system. Such dual-plane systems are described more particularly in U.S. Pat. No. 2,933,980 issued Apr. 26, 1960 to Moore, et al., particularly in FIG. 3; and in "Introduction to Monopulse" by Rhodes, published by McGraw-Hill (1959), particularly in chapter 4. The four-horn antenna feeds employed with such dual-plane systems may be either of the phase-sensing type which has the phase centers of two apertures spaced apart from the phase centers of the remaining two apertures, or of the amplitude sensing type which has the phase centers of two apertures not spaced apart from the phase centers of the other two apertures, or may employ one type in one of the two mutually orthogonal planes and the other type in the second plane, as is described in U.S. Pat. Application No. 709, 729, now U.S. Pat. No. 3,071,769, filed Jan. 16, 1958 by Randall, et. al., assignors to North American Aviation, Inc., assignee of the subject patent application.

Such mutually orthogonal dual-plane systems variously combine the received pulse echoes in the several channels of the antenna feed structure to provide: a first and second difference channel for determining azimuth and elevation target angles respectively, and a sum signal in a third channel both for indicator display functions and for determining target range. Hence, conventionally only target range and mutually orthogonal target angle information are obtained from a dual-plane monopulse receiving system. (Of course, where the angular size of the target is large relative to the beamwidth of the combined four-horn beam or sum signal pattern, mechanical scanning means in cooperation with the antenna assembly may be employed to provide information as to target shape and extent, which information is of limited accuracy in the scanning plane.) Moreover, where the radial range extent of the target is large relative to the pulsewidth of the radar energy, the duration of received target signal is also indicative of the target radial extent (e.g., size in terms of incremental range distance).

Hence, the prior art improvements in dual-plane monopulse receiver systems have provided limited means for generating and displaying information concerning target range and target angle information; and (for target sizes which are large relative to the pulsewidth and beamwidth of a scanning beam) target shape and size or extent.

However, such prior art has not provided adequate target extent information regarding targets having sizes or shapes which are small relative to the beamwidth of the radar antenna, including distinguishing between two or more small targets lying within the beamwidth of the antenna and separated radially by an amount corresponding to less than the transmitted pulsewidth. In other words, the resolution of target shape and size in the radar art is limited by the beamwidth of the receiving antenna and the pulsewidth of the transmitted radar energy.

Although it would appear desirable to narrow the beamwidth of the radar antenna in order to improve target resolution, such narrowed beamwidth is achievable only by increasing the size of the antenna dish. In an airborne radar system, however, the maximum antenna dish size is dictated by the overall geometry and installation provisions of the utilizing aircraft, which do not admit oversized antennas.

Narrower beamwidths are more easily obtainable from shorter wavelength devices or optical energy systems such as laser transmitting and receiving system. However, the present state of the art in laser devices does not provide sufficiently reliable means having an adequate pulse-repetition rate, and are not therefore operationally suitable for airborne military ground-mapping missions.

Further, although it would appear desirable to shorten the pulsewidth of the pulsed energy (whether radar or laser light energy), the minimal pulsewidth requirements are determined by the desired maximum range performance of such active or ranging system. In other words, the minimal pulsewidth is determined by the required energy level for the received signal, above a background noise energy level, whereby the mere presence of a target can be determined amid such noise.

The concept of the subject invention relates to the use of the improved resolution of passive optical sensing means directed at radar-detected targets for providing display signals indicative of the shape of such targets, in response to infrared energy or low-level visual light energy or other forms of light energy radiated from such targets, particularly cultured targets such as factories and like manmade structures.

In a preferred embodiment of the invention, there is provided a directionally-scanning radar system having a directional antenna, and providing a first signal having a time-occurrence (relative to a system trigger) indicative of the range of a detected target and second signal having an amplitude indicative of the direction of the target detected by the radar system. There is also provided a passive optical sensor having a field of view smaller than the beamwidth of the radar antenna and further having an optical axis oriented relative to the boresight axis of the radar antenna, the optical sensor being responsive to the second signal of the radar system for directing the optical axis toward the radar-detected target. There is further provided display means responsive to the radar system for providing a display indicative of the range and direction of the radar-detected target, the display means being intensity modulated by the output of the passive sensor.

In normal operation of the above-described system, the narrower beamwidth response of the passive optical sensor to light energy such as infrared energy radiated from such target, provides a display signal of improved angular resolution, whereby the scanning of such narrower beamwidth results in an improved display indication of target shape and size. Accordingly, it is an object of the subject invention to provide an improved display of a radar-detected target which radiates other forms of radiant (reflected or emitted) energy.

It is another object of the subject invention to provide a display having improved angular resolution for a radar-detected target which emits other forms of radiant energy.

It is still another object of the invention to provide improved means for indicating the size and shape of a radar-detected target.

It is yet another object of the invention to provide optical sensing means of improved angular resolution for generating display signals indicative of the shape of a detected target.

It is a further object of this invention to employ a multiplicity of sensors in order to more readily distinguish a multiple-energy type of detected target from other targets.

It is still a further object of the subject invention to provide range information relative to radiating targets which are detected by high angular-resolution passive or active sensors such as infrared, television, or low light-level television devices.

These and other objects of the subject invention will become apparent from the following description taken in conjunction with the accompanying drawings in which.

In the FIGS. like reference characters refer to like parts.

Figure 1:
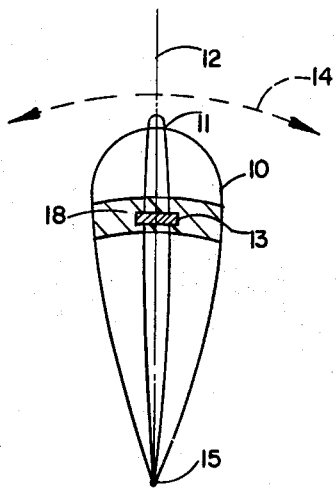
FIG. 1 is a plan view of an exemplary beamwidth of a conventional radar antenna exemplary view angle of a passive optical sensor, illustrating the relatively improved angular resolution obtainable from an optical sensor, in an airborne terrain mapping situation.

Referring to FIG. 1, there is illustrated in plan view an exemplary beamwidth 10 of a conventional radar antenna (located at point 15) and an exemplary view angle response pattern 11 of a passive optical sensor (located proximate to point 15), depicting the relatively improved angular resolution obtainable from an optical sensor. Where the optical axis of the optical sensor is slaved in azimuth to the boresight axis 12 of the antenna, it is apparent that the optical sensor corresponding to response pattern 11 will provide a signal only in response to a target lying within the lesser azimuthal extent of pattern 11 (or portion thereof) on or near boresight axis 12. However, radar system corresponding to antenna response pattern 10 will provide a signal in response to a target (or portion thereof) lying anywhere within the greater azimuthal extent of pattern 10. Hence, where the boresight axis 12 is caused to scan back and forth in azimuth (as indicated by the dotted arc 14), over a target 13 having an azimuthal extent or size smaller than the antenna beamwidth and which both reflects radar energy and radiates optical energy (such as infrared), the resolution of the resulting radar image displayed on a conventional PPI device would be limited by such antenna beamwidth. However, the true azimuthal extent and size of such multiple-energy type target 13, as displayed in response to the output of the scanning optical sensor, would be more clearly indicated as to be substantially improved.

Figure 2:
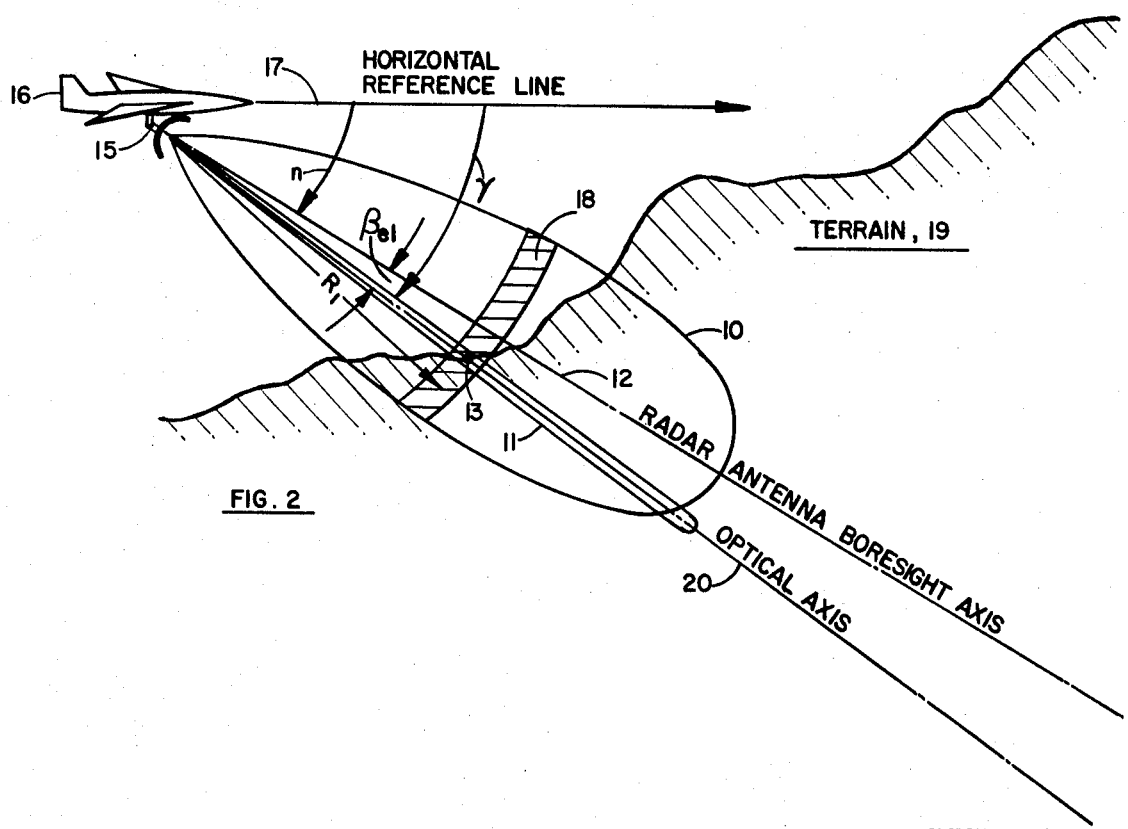
FIG. 2 is an elevation view of the response patterns of FIG. 1.

A similar improvement in the elevation resolution and radial extent indication of a radar-detected target is shown in FIG. 2.

Referring to FIG. 2, there is illustrated an elevation view of the response patterns of FIG. 1, as provided by an airborne arrangement adapted for a terrain-mapping application. The antenna boresight axis 12 of the antenna pattern 10 originating from the airborne position 15 (provided by an aircraft 16) is oriented in a substantially forward-looking direction and angularly declined at a vertical angle ($\eta$) relative to a horizontal reference line 17. Arcuate strip 18 represents a pulsewidth of radar energy transmitted by an antenna located at point 15 which intersects the terrain profile 19 at target point 13 off the boresight axis 12 by the angular amount $\beta_{el}$ and corresponding to a slant range $R_t$. However, due to the pulsewidth of the pulsed radar energy (corresponding to an incremental range distance, $\Delta R$), range $R_t$ will be indicated as $R_t \pm \Delta R$, and the point 13 will be limited in radial resolution to a spot having a radial extent of $\Delta R$. Moreover, the angular extent in elevation of target point 13 as provided by the return or reflection of that portion of the radar energy impinging on terrain point 13 at range $R_t$ cannot be distinguished from the larger angular extent of the antenna beamwidth 10 in elevation, should the antenna boresight axis 12 be scanned in elevation. Such elevation scanning is referred to as nodding, and may be combined with the azimuth scanning-mode in a mapping function. Alternatively, for some airborne mapping missions the nodding mode may be omitted, and the forward motion of the vehicle is relied upon to map successive terrain along and about the vehicle flight path.

The response pattern of an optical sensor having a view angle substantially less than the beamwidth 10 of a radar antenna is depicted in FIG. 2 by lobe 11 having an optical axis 20. Where the optical axis 20 is directed toward the direction ($\gamma = \eta + \beta_{el}$) of the detected radar target 13, then the response of such optical sensor to light energy radiated or reflected by target 13 may be employed by display means to generate a target display having improved resolution. In other words, by slaving the optical axis 20 in azimuth to the boresight axis 12 of an azimuthal-scanning radar system, and directing such optical axis 20 in elevation toward targets detected by such radar system, a display device responsive to the radar system (for range and azimuth information) may be made further responsive to such a passive optical sensor to provide a display of target shape and size having improved resolution.

Figure 3:
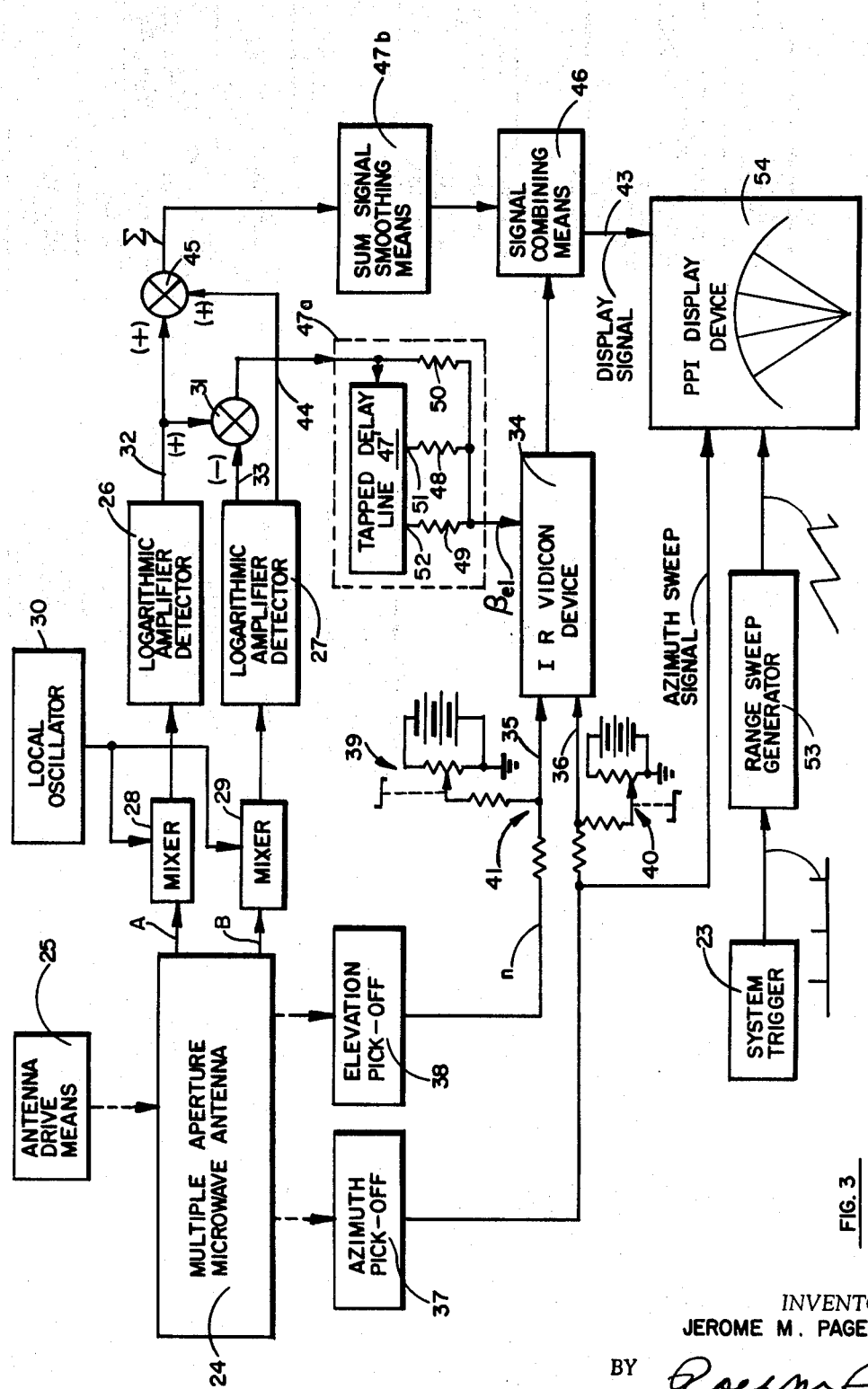
FIG. 3 is a schematic arrangement of a preferred embodiment of the invention.

A preferred arrangement for achieving such functional result is shown in FIG. 3.

Referring to FIG. 3, there is illustrated a schematic arrangement of a preferred embodiment of the concept of the invention. There is provided a radar system comprising a system trigger 23 and a monopulse receiver for generating a signal indicative of the elevation angle-off-boresight $\beta_{el}$ of a radar-detected target. The monopulse receiver is comprised of a multiaperature microwave antenna 24 in driven relationship to antenna drive means 25. Drive means 25 provides means for scanning the antenna in azimuth and may also include means for space-stabilization of the antenna, as is well understood in the art.

The outputs A and B of at least two apertures, mutually arrayed in elevation, of antenna 24 are severally fed to signal amplifying channels comprising logarithmic amplifier-detectors 26 and 27, providing logarithmically detected video signals. Interposed between the inputs of detectors 26 and 27 and the corresponding outputs of antenna 24 are mixers 28 and 29 in cooperation with a local oscillator 30 for reducing the received signals from microwave signals to intermediate frequency (I.F.) signals adapted for amplification by the tuned IF amplifier stages of amplifiers 26 and 27, as is well understood in the art.

Detectors 26 and 27 are arranged to provide detected outputs of mutually exclusive sense or polarity on lines 32 and 33, whereby combining such outputs by summing means 31 provides a signal indicative of the magnitude and sense of the difference therebetween. Such mutually opposite sense is achieved by merely reversing the polarity of the diode detector of one of amplifiers 26 and 27, as is understood in the art. Further, because of the logarithmic response of detectors 26 and 27, the difference signal is indicative of the elevation angle-off-boresight ($\beta_{el}$) of the detected target 13 (as shown in FIG. 2), as is understood in the monopulse art.

Detector 27 is further arranged to provide (on line 44) a second detected signal of a like polarity as detector 26 by the addition of a second suitably-poled output diode, as is understood in the art. Hence, such signal on line 44 may be combined with the signal on line 32 by means of second summing means 45 to provide a monopulse sum signal, the magnitude of which is substantially invariant with variations in the angle-off-boresight of a radar-detected target.

There is further provided a passive optical sensor such as an infrared sensitive vidicon device 34 which is boresighted relative to the boresight axis of radar antenna 24. The function of such passive optical sensor is to provide an electrical output signal in response to the total light energy received over the spectral bandwidth to which the device is responsive, in response to energy sources lying within a select view angle. The construction and arrangement of vidicon device 34 is well understood, such device being commercially available, for example, from the Electronic Tube Division of Westinghouse Electric Corporation, Elmira, New York as vidicon tube Type 7290.

The optical axis of the receiver optics of vidicon device 34 is boresighted with respect to antenna 24, the boresight axis of antenna 24 and the optical axis of sensor 34 being substantially parallel. Such relative orientation of sensor 34 may be maintained by mounting it upon the antenna, whereby antenna 24 and vidicon 34 are commonly driven by antenna drive means 25, the boresighting procedure comprising the application of suitable bias signals to the deflection control inputs 35 and 36 of vidicon tube 34. At Alternatively, vidicon 34 may be mounted in a nominal orientation relative to the fuselage reference line (F.R.L.) of the utilizing aircraft, and deflection control signals fed to the deflection control inputs of vidicon 34 from an azimuth pickoff 37 and elevation pickoff 38 or other means known in the art for providing a control signal indicative of the angular orientation of antenna 24 relative to the FRL (or body axes) of a utilizing aircraft, as shown in FIG. 3. The output of first and second calibration signal sources 39 and 40 may yet be required for selecting or adjusting the nominal orientation of the optical axis of sensor 34 relative to the aircraft FRL, the outputs of which may be summed or combined with the respective elevation and azimuth deflection control signals by means of summing means 41 and 42 respectively.

Additionally, the monopulse receiver output signal from element 31, indicative of the elevation component $\beta_{el}$ of the target angle-off-boresight, is fed to an elevation deflection control of vidicon 34. Hence, means has been provided for directing the sensitive axis of optical sensor 34 toward a radar-detected target during a radar return received from such target. Accordingly, the time-occurrence of an output signal from the scanned passive sensor 34, relative to the system trigger 23, is indicative of the range of the detected target as to be suitable for direct application to a PPI display device 41 for intensity modulation thereof.

PPI display 41 is responsively connected to the azimuth sweep signal provided by azimuth pickoff means 37 (in cooperation with scanning antenna 24) and a range sweep generator 53 (in cooperation with system trigger 23), as is well understood in the art. The output of sensor 34 is applied to the display intensity modulation control input 43 of indicator 54.

In ordinary operation of the arrangement of FIG. 3, the sensitive axis of vidicon 34 is directed toward a radar-detected target lying within the beamwidth of antenna 24 during the time such target is detected. Hence, the time occurrence of the display modulation signal from sensor 34 is indicative of the combination of (1) range of the target (corresponding to the coincidence of the modulation signal with a portion of the cyclical output from range sweep generator 42) and (2) the azimuth direction of the target (corresponding to the coincidence of the display signal with an output from azimuth pickoff 37). In other words, the displayed target position on the PPI indicator in response to the intensity modulation provided by sensor 34 corresponds to the observed direction and range of the detected target.

Additional displays may be evolved from the signals provided by the device of FIG. 3. For example, a T.V.-like display of elevation versus azimuth may be provided by employing the signals from pickoffs 38 and 37 for position control of a display tube beam, and intensity modulating said beam in response to the output of element 46.

Further, the lesser angular extent of the vidicon view angle (relative to the antenna beamwidth) for the forward-moving, azimuthal-scanning arrangement described, provides an improved indication of the shape and size of a radar target which also radiates light energy within the spectrum of the sensitivity of sensor 34.

It is to be noted that where the read-out of the vidicon device cannot be accomplished at the radar system PRF (pulse repetition frequency), then the sweep generator would sweep at a reduced rate corresponding to the reduced vidicon read-out rate and in synchronism with corresponding ones of the system trigger (i.e., a frequency divider circuit may be interposed between the system trigger 23 and the input to generator 42).

Because the described arrangement slaves the optical axis of sensor 34 to the boresight axis of antenna 24 only in azimuth, and directs the optical axis in elevation toward a radar-detected target, it is possible that the optical axis may be pointed at an infrared target other than the radar-detected target producing the signal $\beta_{el}$. For example, where the radar-detected target is off-boresight in azimuth by an amount $\beta_{az}$ as well as off-boresight in elevation by an amount $\beta_{el}$, then the optical sensor would not be looking at the radar-detected target (off-boresight in azimuth), but would be looking along the boresight in azimuth and elevated thereabove by the elevation angle $\beta_{el}$. However, such effect is not considered significant for mapping applications, in view of the azimuthal-scanning mode of the system whereby the optical sensor makes its own azimuth surveillance of an optical target as to provide a correct indication of the azimuthal extent thereof. Further, usual radar detected terrain prominences or radar topography will not usually display such changes in range over the azimuthal extent of an antenna beamwidth as to produce significant mapping errors. In other words, the inventive multisensor approach described for employing radar system indications of range and azimuth and optical sensor indications of target extent, provides a PPI or map display of sufficiently improved resolution and utility in relating one's airborne position to an aerial navigation map, as to outweigh the minor and random nature of the possible lack of precise azimuthal and range coincidences between the radar-detected target and the optical-sensed target.

Moreover, in view of the passive nature of optical sensor 34 of FIG. 3, such sensor will provide an output in response to any target which radiates light energy within the spectrum or spectral beam beamwidth of the sensor response even if such "radiating" target is not a reflector of transmitted radar energy. In such latter situation, no $\beta_{el}$ signals would be generated by the radar receiver for controlled orientation of the sensitive axis of optical sensor 34; and sensor 34 would provide an output signal in response to whatever optical target it was directed toward. Further, because no time-occurrence or range indication control is thus provided by the radar receiver in the absence of a radar target (e.g., a target having a suitable coefficient of reflectivity), the range-display indication of the optical sensor would be arbitrary and erroneous.

Such condition may be avoided by limiting the response of indicator 41 to the output of sensor 34 only during the coincidence of such output with an output from the monopulse receiver of FIG. 3. Such time coincidence between the radar-detected target and the target sensed by sensor 34 may be determined by coincidence gating the output of sensor 34 with the sum signal output from summing means 45 by means of a coincident gate 46 interposed between elements 34 and 43 in FIG. 3. Alternatively, the monopulse sum signal and the optical sensor signal may be multiplied by a signal multiplier. Hence, signal combining means 46 is shown in block form only.

Such multiple energy correlation, or coincidence gating, not only provides a mapping display of improved resolution, but also is less susceptible to jamming. Such reduced susceptibility to jamming occurs because radiant energy of both the pulsed energy bandwidth and the spectral response of the sensor need be coincident in both time and space in order to cause the indicator 41 to respond thereto.

The radar signals to which the system is normally intended to respond are generally noisy. In other words, although the motion of mapping vehicle 16 of FIG. 2 from pulse to pulse of the radar is negligible and although the incremental change in azimuth of the scanning antenna pattern 11 from pulse-to-pulse is entirely within or less than the antenna beamwidth, yet the radar signals for two successive pulse periods are not exactly identical due to noise or nontime-coherent signal components. The effect of such noise component in the target angle $\beta_{el}$ signal from first summing means 31 causes jitter in the directional signal fed to passive sensor 34; and the effect of such noise component in the sum signal output from second summing means 45 causes random modulation or noise in the output from signal combining means 46. The combined effect of such noise in the outputs from elements 31 and 45 is a noisy display by indicator 41, but for the compensation or smoothing provided by cyclically time-coherent smoothing filters 47a and 47a interposed at the respective outputs of summing means 31 and 45.

Each of smoothing means 47 may be similarly constructed and arranged to provide an output signal indicative of the average, or cyclically time-coherent, component averaged over a preselected number of pulse repetition periods, the number selected to be less than that number required for the antenna to sweep in azimuth an angular distance equal to the beamwidth or resolution of the radar system.

Because of the similar construction and arrangement of smoothing means 47a and 47b, a description of the exemplary arrangement and functional operation of element 47a will suffice to explain both of elements 47a and 47b. Smoothing means 47a may be comprised of a tapped delay line 47' having an input terminal responsive to the output of summing means 31 and one or more output taps for providing successively delayed output signals in response to an input signal. Each tap is spaced to provide a delay corresponding to a successive integer number of pulse repetition periods of the system trigger of the pulsed radar system of FIG. 3. For example, first tap 51 provides an output delayed one pulse repetition period relative to the occurrence of the input to delay line 47', and second tap 52 provides an output delayed two pulse repetition periods. The outputs at taps 51 and 52 are combined with the input to delay line 47' by means of summing resistors 48, 49 and 50, a first terminal of each of resistors 48, 49, and 50 being commonly interconnected connected to provide an output terminal, and a second terminal of each of resistors 48, 49 and 50 being connected to a respective one of the output terminals and input of delay line 47'.

Figure 4:
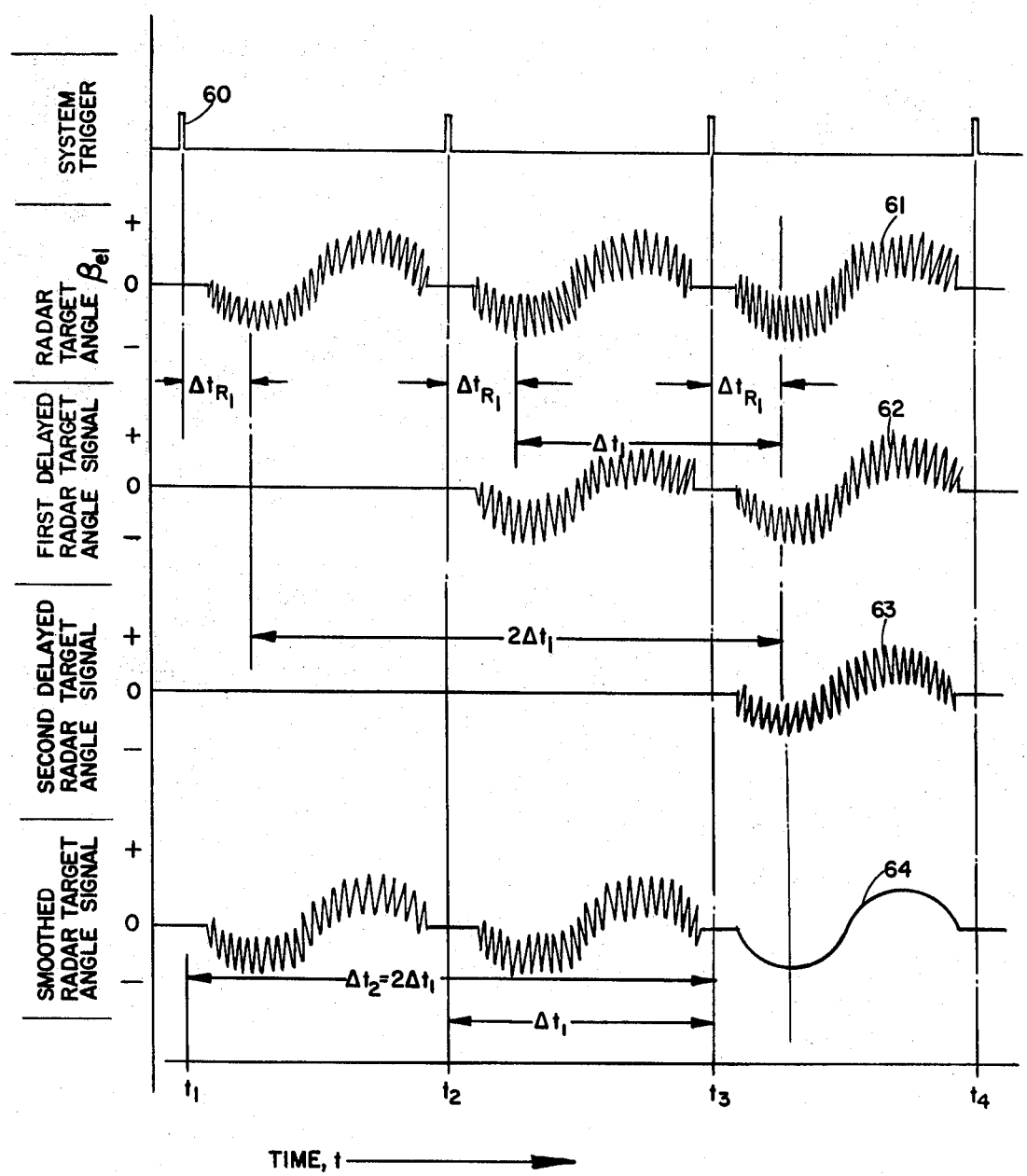
FIG. 4 is a family of time histories of the smoothing function response of the device of FIG. 3.

The cooperation of signal-averaging means 47a with the radar receiver of FIG. 3 to provide signal smoothing may be more readily understood by reference to the time histories shown in FIG. 4.

Referring to FIG. 4, there is illustrated a family of time histories of the response of the system of FIG. 3 over a period of three cycles of the system trigger 23. Curve 60 represents the cyclical output of system trigger 23, occurring, for example, at successive times $t_1$, $t_2$, $t_3$ and $t_4$, the intervals between successive ones of times $t_1$, $t_2$, $t_3$ and $t_4$ being equal and corresponding to the pulse repetition period ($\Delta t_1 = 1/PRF$).

Curve 61 represents the time history of the radar receiver output from summing means 31 (e.g., a signal indicative of the angle $\beta_{el}$ versus range-time for the terrain profile of FIG. 2), illustrating the noisy quality thereof. The shape of the time history 61 corresponds with the early radar return from terrain at short ranges or close to vehicle 16 (of FIG. 2) and below the antenna boresight axis 12 (indicated by the negative sense (−) of $\beta_{el}$ for such portion of curve 61 in FIG. 4); and further corresponds with the late radar return (within the pulse repetition period) from terrain at far ranges distant from vehicle 16 (of FIG. 2) and above the antenna boresight axis 12 (indicated by the position sense (+) of $\beta_{el}$ from such portion of curve 61 in FIG. 4).

Curve 62 represents the time history of the output on first summing resistor 48 of FIG. 3 (delayed relative to the input to tapped delay line 31 by an interval equal to one cycle of the system trigger pulse repetition frequency); and curve 63 represents the time history of the output on second summing resistor 49 of FIG. 3 (delayed relative to the input to delay line 31 by an interval equal to two cycles of the system trigger). Curve 64 represents the smoothed output from smoothing means 47a of FIG. 3, corresponding to the sum of curves 61, 62 and 63. In other words, the output of smoothing means 47a (curve 64 in FIG. 4) during the pulse repetition interval occurring between $t_3$ and $t_4$ is indicative of the time-history sum or average of curve 61 over each of the three cycles, $t_1$ to $t_2$, $t_2$ to $t_3$ to $t_4$.

For example, the smoothed $\beta_{el}$ signal (curved 64) occurring at a range time $\Delta t_R$ (corresponding to a range distance $R_1$) during the pulse repetition period $t_3$ to $t_4$ is the sum or average of the $\beta_{el}$ signal occuring at such range time during each of pulse repetition periods $t_1 - t_2$, $t_2 - t_3$, and $t_3 - t_4$, whereby the effect of the noise present in each of the $\beta_{el}$ ($\Delta t_{R_1}$) samples is reduced and a smoother $\beta_{el}$ signal is achieved. Where the pulse repetition frequency (PRF) is high relative to the azimuth scan rate $d\theta/dt$ divided by the azimuthal beamwidth $\Delta\theta$, $\theta$, then the azimuth positional accuracy of the system is only slightly degraded by the use of the radar signal smoothing means. In equation form:

$$PRF \gg \frac{d\theta}{dt} \frac{1}{\Delta\theta}$$

In other words, the numbers ($N + 1$) pulse repetition periods averaged (corresponding to N taps of the tapped delay line) is determined as $$\frac{1}{N} > \frac{d\theta}{dt} \frac{1}{\Delta\theta PRF}$$

Such slight degradation of the azimuth positional accuracy is more than compensated for by the improved signal quality and smoothing of the receiver signals (from elements 31 and 45) provided by smoothing elements 47a and 47b.

Although signal smoothing elements 47a and 47b have been described and illustrated in an exemplary embodiment in terms of a tapped delay line configuration, the construction and arrangement thereof are not so limited, any form of periodic time-coherent data correlation for combining successive data for each position or combination of azimuth and range of interest being suitable. For example, each of smoothing devices 47 might comprise a magnetic recording drum and data analyzer of U.S. Pat. No. 2,933,724 issued on Apr. 19, 1960 to R. M. Ashby, assignor to North American Aviation, Inc., assignee of the subject invention. Alternatively a scan-converter might be employed to perform such function.

Although the passive sensor 34 of FIG. 3 has been described as an infrared sensor, it is to be understood that passive sensor 34 might be a low light-level sensor of visible light. Further, although only one such passive sensor has been shown in cooperation with the radar signal correlation 46, the concept of the invention is not so limited, it being possible to employ a plurality of passive sensors, each selected to be sensitive to a different portion of or spectral bandwidth of the radiant energy spectra, such as infrared and low-level visible light whereby the detection and distinction of a multiple-source target from a radar target is substantially enhanced.

Hence, the device of FIG. 3 provides multiple sensor means for providing a display having improved resolution of target size and shape, and further providing means for multisensor correlation.

Although the device of FIG. 3 is applied to a PPI display, and additional display type may be achieved from the signals provided by the device of FIG. 3. For example, a T.V.-like display of elevation versus azimuth may be provided by employing the signals from pickoffs 37 and 38 for position control of a display tube beam, and intensity modulating such beam in response to the output of element 46, in a manner well understood in the art.

Although the invention has been described and illustrated in detail, it is to be clearly understood that the same is by way of illustration and example only and is not to be taken by way of limitation, the spirit and scope of this invention being limited only the terms of the appended claims.

I claim:

1. Multiple-sensor means for detecting a multiple-energy target comprising:

pulsed energy monopulse scanning means for providing signals indicative of the range and direction of a detected target;

passive radiant energy means in cooperation with said monopulse means for providing signals indicative of radiant energy radiated from said direction other than said pulsed energy; and signal combining means responsive to said pulsed energy means and said passive sensor means for providing a display signal indicating the presence of a target which both reflects said pulsed energy and radiates said radiated energy.

2. The device of claim 1 in which there is further provided mapping display means responsive to said range and direction signals and to said signal combining means, whereby the resolution of the display provided by said indicator is improved.

3. In a radar system having an antenna and a mapping display indicator, means for providing a target display having improved resolution, comprising:

a passive optical sensor having a view angle smaller than the beamwidth of said antenna and an optical axis slaved to the boresight axis of said antenna in a first one of two mutually orthogonal planes containing said boresight axis;

means responsive to said antenna for directing said optical axis of said optical sensor in a second one of said mutually orthogonal planes toward a target detected by said radar; and coincidence gating means responsive to said radar system and an output of said optical sensor for providing a display signal to said mapping display indicator.

4. In a radar system having a scanning antenna, means for providing a mapping display of improved angular resolution comprising:

a passive optical sensor having a field of view smaller than the beamwidth of said antenna and further having an optical axis;

means responsive to said radar system for directing said optical axis of said sensor in elevation toward a detected target detected by said radar system;

PPI display means having an azimuthal directional input and range input responsive to said radar system and an intensity modulation input responsive to said passive sensor.

5. In a radar system adapted for airborne mapping use, and having an azimuth-scanning directional antenna whose boresight axis of directivity is declined, the combination comprising:

a passive optical sensor having an optical axis proximate to and electronically slaved parallel in azimuth to said boresight axis of said antenna and providing an electrical output signal indicative of a sensed optical target;

means responsive to said radar system for directing said optical axis in elevation toward a detected target detected by said radar system;

display means responsive to said radar system and said passive sensor for providing a mapping display indicative of the angular extent, shape and range of said target.

6. In a directionally-scanning pulsed radar system having a directional antenna and providing a first signal having a time-occurrence indicative of the range of a detected target, and a second signal having an amplitude indicative of the target angle of said target detected by said radar system, the combination comprising:

a vidicon device for providing an output voltage indicative of sensed light energy, the optical beamwidth to which said vidicon responds being less than the beamwidth of said antenna of said radar system, said vidicon being further responsive to said second signal for directing an optical axis of said optical beamwidth toward said radar-detected target;

display means responsive to the coincidence of the outputs from said vidicon device and said first received signal of said radar system for providing a PPI display having improved target image resolution.

7. In a pulsed energy type monopulse radar system providing radar signals severally indicative of the range and angle-off-boresight of a detected target and having a directional scanning antenna, improved radar mapping means comprising:

a passive optical sensor having a field of view smaller than the beamiwdth of said antenna and further having an optical axis slaved in azimuth to the direction of said directional antenna;

first means responsive to said received signals for orienting said optical axis in elevation toward said radar-detected target;

second means responsive to the coincidence of said radar signals and an output of said oriented optical sensor for providing a display signal, whereby a display of improved resolution is provided.

8. The device of claim 7 wherein there is further provided time-coherent signal-smoothing means for severally smoothing said radar range signal and said radar angle-off-boresight signal, each said signal smoothing means comprising means responsive to an associated one of said range and angle-off boresight radar signals for continuously combining corresponding portions of the signals received over a preselected number of successive pulse repetition intervals of the pulsed radar system.

9. The device of claim 7 wherein there is further provided signal smoothing means for severally smoothing said radar range signal and said radar angle-off-boresight signal, each said signal smoothing means comprising;

a tapped delay line having an input terminal responsive to said signal to be smoothed and a preselected plurality of output taps providing successively delayed output signals in response to an input signal, each said tap being mutually spaced to provide a time delay corresponding to a successive integer number of pulse repetition periods of said radar;

a plurality of summing resistors corresponding to one more than the number of said output taps, a first terminal of each of said resistors being commonly interconnected to provide an output terminal, and a second terminal of each of said resistors being connected to a mutually exclusive one of said input terminal and output taps of said tapped delay line.

10. The device of claim 7 wherein there is further provided signal smoothing means for severally smoothing said radar range signal and said radar angle-off-boresight signal, each said signal smoothing means comprising a tapped delay line having an input terminal responsive to said signal to be smoothed and a preselected plurality of output taps providing successively delayed output signals in response to an input signal, each said tap being mutually spaced to provide a time delay corresponding to a successive integer number of pulse repetition periods of said radar, a plurality of summing resistors corresponding to one more than the number of said output taps, a first terminal of each of said resistors being commonly interconnected to provide an output terminal, and a second terminal of each of said resistors being connected to a mutually exclusive one of said input terminal and output taps of said tapped delay line, the number of said taps N of said delay line being related to the scan rate $d\theta/at$, and beamwidth $\Delta\theta$ of said antenna and the pulse repetition period of said radar as follows:

$$\frac{1}{N} > \frac{d\theta}{at} \frac{1}{\Delta\theta PRF}$$